United States Patent [19]

Amon et al.

[11] Patent Number: 5,663,825

[45] Date of Patent: Sep. 2, 1997

[54] STABILIZED STEP/STARE SCANNING DEVICE

[75] Inventors: Max Amon, Maitland; Burnham Stokes, Altamonte Springs, both of Fla.

[73] Assignee: Martin Marietta Corporation, Bethesda, Md.

[21] Appl. No.: 478,391

[22] Filed: Jun. 7, 1995

[51] Int. Cl.[6] .......................... G02B 26/08; G02B 26/10; G01D 5/30
[52] U.S. Cl. .................. 359/201; 359/196; 359/401; 250/334; 250/230; 250/236; 250/347
[58] Field of Search .................. 359/196, 197, 359/198, 201, 212, 213, 554–557, 401; 250/203.1, 230, 236, 347, 334

[56] References Cited

U.S. PATENT DOCUMENTS

| | | | |
|---|---|---|---|
| 3,909,105 | 9/1975 | Neiswander et al. | 359/201 |
| 4,763,192 | 8/1988 | Moore et al. | 348/167 |
| 4,772,798 | 9/1988 | Craig | 250/353 |
| 4,773,754 | 9/1988 | Eisele | 356/139.05 |
| 4,952,809 | 8/1990 | McEwen | 250/342 |
| 4,982,092 | 1/1991 | Jehle | 250/332 |
| 5,225,923 | 7/1993 | Montagu | 359/199 |
| 5,243,351 | 9/1993 | Rafanelli et al. | 342/351 |
| 5,338,933 | 8/1994 | Reeves et al. | 250/334 |
| 5,510,618 | 4/1996 | Blecha et al. | 250/334 |
| 5,512,741 | 4/1996 | Levaillant et al. | 250/203.3 |

*Primary Examiner*—Paul M. Dzierzynski
*Assistant Examiner*—Darren E. Schuberg
*Attorney, Agent, or Firm*—Burns, Doane, Swecker & Mathis, L. L. P.

[57] ABSTRACT

A method and apparatus for holding a line of sight in a scanning imaging system wherein there is continuous relative movement between the field of view of the system and an image plane. A descan mechanism temporarily holds a line of sight within a field of regard as a scanning mechanism such as a gimbal continuously moves imaging optics relative to the object space. The descan mechanism descans the image, the descan mechanism's relative movement being opposite to the direction of movement of the gimbal, so as to hold a line of sight for a time period and thereafter snap to a new field of view to thereafter descan the new line of sight for another time period. With the present invention a scanning system can be used with an imaging device requiring time integration for greater sensitivity, such as a staring electronic detector array or photographic film, without necessitating the physical scanning motion to be cyclically stopped and restarted.

16 Claims, 3 Drawing Sheets

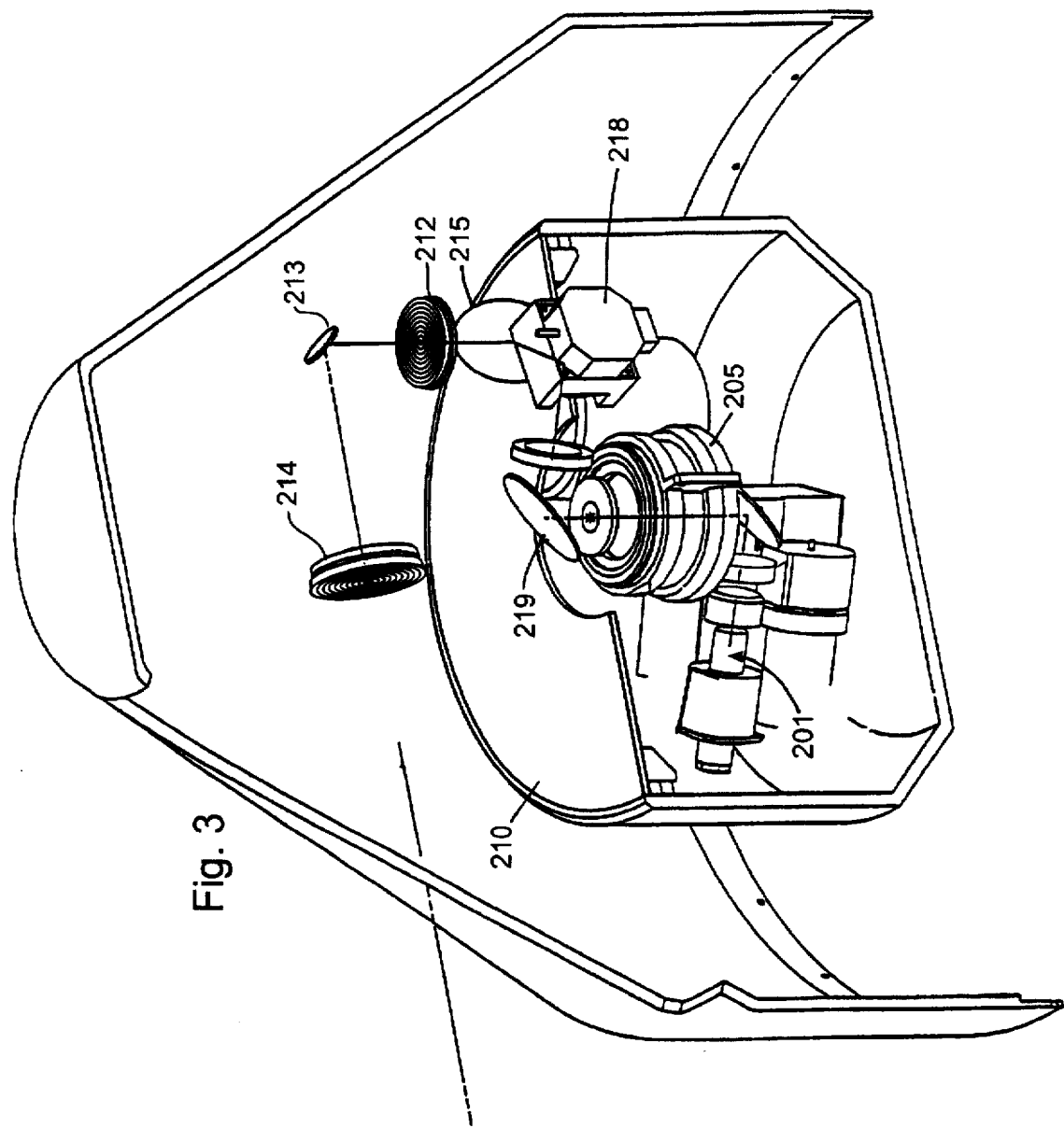

STABILIZED STEP/STARE SCANNING DEVICE

BACKGROUND OF THE INVENTION

1. Field of the Invention

The present invention relates to a scanning system and more specifically to a scanning system wherein a field of view is temporarily held so as to permit time integration of an image in an imaging plane.

2. Discussion of Related Art

In conventional continuous scanning imaging apparatuses such as Infrared Search and Track (IRST) systems, imaging optics continuously scan through a Field Of Regard (FOR) focusing an image of a more limited Field of View (FOV) upon a detector array. For instance, imaging objects have been mounted to a gimbal capable of rotating 360 degrees to image a field of regard of 360°×18°, for example. As the gimbal rotates, the imaging optics sequentially images fields of view within a field of regard. In order to perform a search and track function, for instance, a sensor must provide a rapid gimbal scan. Rapid gimbal motion (e.g., 240 degrees/sec. minimum) is only practical if the motion is smooth and continuous. The image impinging upon the detector array, however, is moving with the movement of the gimbal. Without compensation, most detectors would provide only a blurred image. This is true because detectors take some incremental amount of time to generate an electronic signal sufficient to represent the image with a certain resolution (e.g., convert enough photons into electrical signals to provide a sufficiently large image signal). The traditional solution is to provide an linear array or a focal plane array with a Time Delay and Integrate (TDI) function.

In these linear or focal plane arrays, the image moves from detector segment to adjacent detector segment as the field of regard is scanned. The resulting charges generated in the respective detector segments are stored in correspondence to each individual detector segment and shifted to the next storage location in synchronization with the image movement such that the converted electromagnetic energy from a single Line of Sight (LOS) in the field of regard is integrated as the image scans across the linear array. By this mechanism, enough electromagnetic energy is converted into electrical energy to provide a sufficient image signal.

However, TDI linear arrays are inefficient. Their inefficiency is due to the clocking time it takes for the charge corresponding to one detector segment to be transferred to an adjacent storage location and for the associated switching electronics. In other words, the total integration time is diminished by the amount of time it takes for the charge to be transferred from one storage location to the adjacent storage location and to the storage location after that. Integration time is key to any imaging system insofar as the longer the integration time is, the greater the sensitive the system.

Staring arrays, which are arrays that do not have a timed delay integrate function, are becoming increasingly important in the imaging field. A staring focal plane array may collect and integrate the signal from a scene for much longer periods of time (1 to 1,000 milliseconds) compared to a TDI device, but a sensor line of sight must be held constant and accurately stabilized to realize the gain in the sensitivity. The problem is, of course, that a staring array requires that it be pointed in a given direction for a given integration time. In a scanning system without some additional mechanism, a staring array would be inappropriate insofar as there would be little if any integration time for each field of view the staring array was focused upon. The image would tend to be blurred if some compensation mechanism were not in place.

The traditional solution for providing an integration time for a staring array in a scanning system is to move the gimbal to a field of view, stop the gimbal to permit the array to stare at the object space for an integration time, and thereafter re-initiate movement of the gimbal to the next field of view. A problem with this solution is that the gimbal tends to be somewhat massive relative to the system. It takes a relatively significant amount of power and time to start the gimbal, stop it for a given field of view and then recommence motion to the next field of view due to the gimbal's inertia. The inertia of this type of system renders the system slow and undesirable.

Whereas the power and settling time required to perform a cyclic start/stop motion with the gimbal is too large to yield a practical system, search and track systems have been limited to linear or TDI focal plane arrays. The integration time of a linear or TDI array is short, on the order of 10 to 100 microseconds. The sensitivity of the scanner limits the range in which the targets may be detected.

SUMMARY OF THE INVENTION

The present invention avoids the above problems and defects in the prior art systems by permitting continuous movement of a relatively massive gimbal by moving a relatively low mass electromagnetic energy redirecting means, such as a fast scanning mirror, to hold a line of sight for an extended integration time so that the relative sensitivity of the system is greatly enhanced. By this mechanism, the inefficiencies of linear arrays and TDI focal plane arrays are avoided while also avoiding the slow physical response of a system requiring cyclic starting and stopping of the relatively massive gimbal.

By this mechanism, the present invention provides for an optical time delay integration of an image on a detector requiring predetermined integration time, such as a staring electronic detector array, photographic film, or any medium capable of imaging which requires some integration time greater than the scanning rate of the optical scanning system.

Specifically, the invention involves a scanning imaging system having a scanning movement between an imaging medium, such as a staring focal plane array or photographic film, and object space. The invention further includes a de-scan mechanism for holding a line of sight in the object space for a predetermined period while the scanning mechanism continues its scanning movement. The de-scan mechanism can be in the form of any of a number of devices capable of redirecting wavefront propagation, such as a fast scanning mirror, Risley prisms, a polygon mirror, etc.

BRIEF DESCRIPTION OF THE DRAWING FIGURES

The present invention will now be described with reference to the exemplary embodiments shown in the drawings accompanying the specification, in which:

FIG. 3 illustrates a scanning optical system for a staring focal plane array for imaging a 360 degree field of regard.

DETAILED DESCRIPTION OF THE PREFERRED EMBODIMENTS

In describing the novel apparatus and method for incorporating a staring focal point array in a search and track system, such as an infrared search and track (IRST) system, reference is made to the accompanying drawings.

A large field of regard (FOR) can be effectively searched in minimum time using an optical system that has a small field of view (FOV) at a consequently high resolution capacity. A fast steering mirror (FSM) 160 such as disclosed in co-pending U.S. patent application Ser. No. 08/047,485 filed Apr. 19, 1993, in the name of Bhikhu Patel, or other electromagnetic energy redirecting means, is employed in collimated light space to hold a stabilized system Line Of Sight (LOS) for a total frame integration time. This permits the gimbal motion to be smooth and continuous while producing a performance superior to the prior art approaches.

A problem addressed by the present invention is providing the sensor a stabilized for a certain time while still providing continuous gimbal motion.

Figure 1:
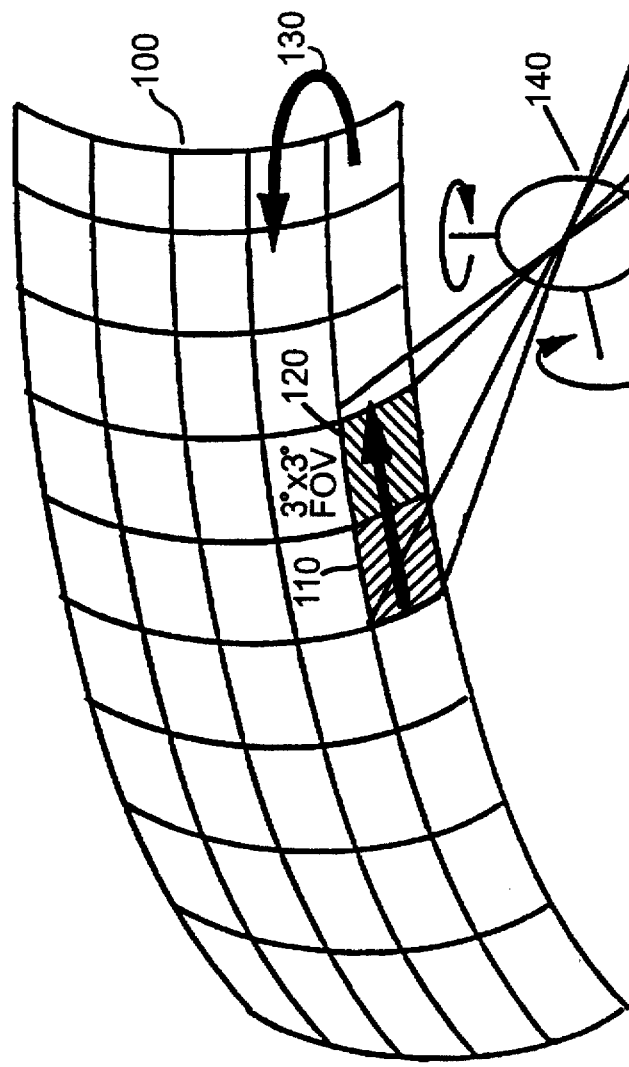
FIG. 1 illustrates a staring focal plane array search and track system.

FIG. 1 shows schematically how the concept may be implemented in one a first embodiment. An afocal optical assembly 140 is mounted on a gimbal (shown functionally by rotating arrows adjacent afocal optics 140 in FIG. 1) that provides a continuous, smooth azimuth and/or elevation scan. A Fast Scanning Mirror (FSM) 160, (which is mounted with the afocal optical assembly 140 such that its relative spacing is held constant relative to the afocal assembly 160 throughout a scan) holds the line of sight of an image frame 110 or "de-scans" the image 150. This provides image stabilization during the integration time of the staring focal plane array 178. While the line of sight of the afocal optical assembly 140 is moving, by virtue of the continuous scan, the system line of sight remains stationary and stabilized so that the detector 178 can integrate the image to form a sufficient image signal.

Because the FSM 160 is roughly one tenth the mass of the gimbal, its movement can be relatively fast and not require significant amounts of energy when compared to cyclically starting and stopping the gimbal. Also, very little integration time is lost in comparison to standard TDI devices.

A typical integration time is 7 milliseconds and a typical gimbal movement for 7 milliseconds is 1.5 degrees in a conventional IRST system. While the gimbal continues to move, the FSM 160 snaps back to its starting position so that the next frame 120 of image may be taken in a similar fashion. The process may be repeated for the entire field of regard 100.

With reference to FIG. 1, as the gimbal continuously scans as shown by the arrow showing rotational motion in the vertical axis of the afocal optics 140, the afocal optics 140 continuously scans the first field of view 110 and the second field of view 120 (in the illustration shown as a 3 degree×3 degree FOV) along a scanning line. As illustrated by arrow 130, serpentine scanning is used, although continuous scanning in a single direction or any other suitable scanning method contemplated to be within the scope of the invention.

The FSM 160 or other electromagnetic energy redirecting means de-scans the gimbal movement during the integration time of focal plane array 178. This de-scan takes the form of rotating the FSM 160 in a direction opposite to the direction of the gimbal motion as shown by the arrow on the upper side of the vertical axis of the FSM 160. The movement of the FSM 160 is controlled by the gimbal control system (not shown) which determines the relative position of the gimbal to the detector 178. The FSM 160 can be used to additionally compensate for vibration and other image quality deteriorating movement in accordance with the teachings of U.S. patent application Ser. No. 08/047,485, herein incorporated by reference.

Figure 2:
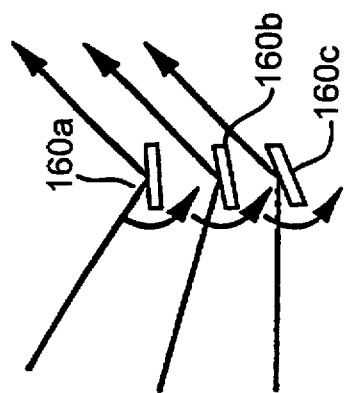
FIG. 2 illustrates the movement of the fast scanning mirror used in the embodiment shown in FIG. 1.

FIG. 2 illustrates that as the gimbal scans horizontally, the image moves. The FSM 160 follows the image keeping it stationary on the focal plane array, as illustrated by the three positions 160A, 160B and 160C in FIG. 2.

The array 178 will integrate the first field of view 110 for about 7 milliseconds in an exemplary embodiment representing the time it takes the gimbal to move about 1.5 degrees. While the gimbal continues to move to the next 1.5 degrees, the FSM 160 returns or "snaps back" to its starting position, as illustrated by the rotational movement arrow on the lower half of the vertical axis shown in FIG. 1 adjacent to the FSM 160. This is so that the next field of view 120 can be integrated in a similar fashion.

This concept can be used in many different applications. FIG. 3 shows an approach for a shipboard application. It provides a 360 degree azimuth scan for 4 inch aperture f/2.5 3–5 micron sensor in this particular embodiment. A 2× afocal optical system including lenses 214 and 212 as well as folding mirrors 213 and 215 collects and other optics the electromagnetic energy and delivers the collimated light to a FSM 218, which de-scans the image in accordance with the invention.

Light energy in the optical path is reflected off the FSM 218 and reflected, via a folding mirror 211, into a reimager 205. The reimage 205 which includes a derotator, such as a prism, to derotate the image for stable projection onto a detector 201 such as a cryogenically cooled staring array quantum well detector in a dewar.

Stated in more detail, the mirror 211 folds the optical path down the center of the vertical axis of the reimager 205. Up to that point all the optics are mounted on and move with the gimbal 210. The optics that follow the vertical fold mirror 211 and the detector 201 do not move with the gimbal 210, and this would otherwise cause the image to rotate on the detector absent an optical derotation device. A Pechan prism, for instance, is incorporated in the reimager 205 to perform a deroll function in this particular embodiment. It is also possible to mount the entire system on a gimbal, in which case there is no need for a deroll device. However, a problem associated with this variation arises out of the need to hermetically seal the system insofar as it would require slip rings and coolant lines to the detector mounted on the rotating gimbal in an infrared light sensing embodiment. This would be difficult for ship board applications.

Figure 4:
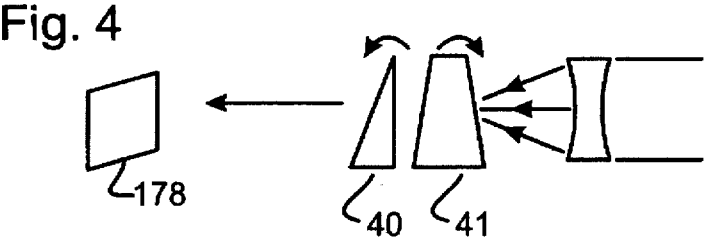
FIGS. 4–8 illustrate alternative electromagnetic energy deflecting mechanisms as alternatives to the fast scanning mirror shown in FIGS. 1, 2 and 3.

In the above embodiment, a FSM 218 is used. However, virtually any device which can change wavefront propagation can be used. For instance, as shown in FIG. 4, Risley prisms 40,41, i.e., a set of prisms that selectively deviate the direction of electromagnetic energy by their relative orientation to one another, can be used. In this known system, the two prisms 4041 are rotated relative to one another to change the direction of the light, thereby permitting use in a de-scan function.

Figure 5:
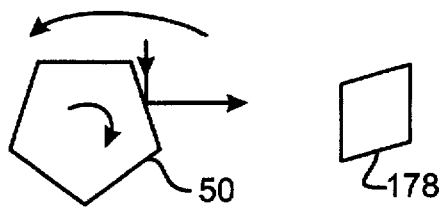

Alternatively, such as shown in FIG. 5, a polygon 50 can be used which rotates in a direction opposite to the gimbal motion to provide the descan function. Other embodiments involve diffraction systems such as a bulk crystal or Bragg cell wherein a change in frequency or frequency chirp causes a change in diffraction as a function of the frequency.

A frequency chirp is input at one side of the Bragg cell thereby changing index refraction and relative deflection of the image passing therethrough. The "snap back" is provided by switching the frequency back to the original frequency and reinitiating frequency chirp. This type of system is used in laser printers, for instance.

Figure 6:
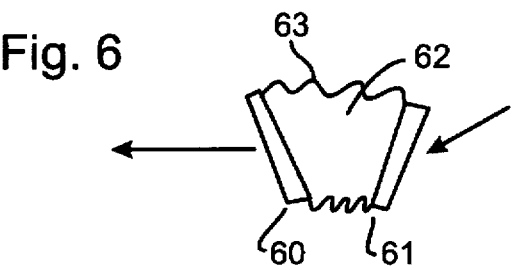

Other mechanisms include two tilt plates 60,61, as shown in FIG. 6, the space in between being filled by a fluid 62, preferably having a matching index of refraction relative to the tilt plates 6061. A bellows 63 holds the fluid in place and, by tilting the two plates 6061 relative to one another, a variable angle prism is formed and deflection of the light energy results. As with the Risley prisms, some variation in the color component is expected.

Figure 7:
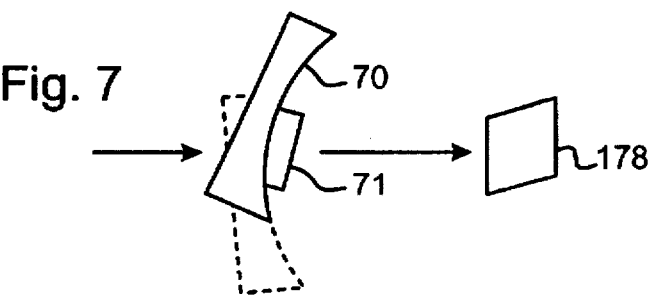

A variation of the Risley prisms is to mount a lens element 70 on a gimbal adjacent to a wedge 71. Relative motion of the lens element 70 to the wedge 71 provides the deviation in light path, such as shown in FIG. 7.

Control of the movement of the electromagnetic deflection device can be controlled by preexisting position encoders which, through signal processing provide an absolute measurement of the relative orientation and movement of the gimbal or other scanning mechanisms. Because synchronizing the movement of objects is known in this art, additional disclosure thereof will not be belabored.

Naturally, other embodiments will suggest themselves to persons skilled in the art. The embodiments discussed above deal with infrared, visible ultraviolet or other wavelengths of light, the propagation direction of which can be changed. As an example of different electromagnetic deflection means, there is some exploration of electronic lenses wherein a pulse of sound waves is input at one end of a lens thereby causing a distortion in the glass and, consequently, a deviation in the direction propagation. Other embodiments use membrane light modulators wherein membranes are coated with a reflective surface to create interference patterns which can be used to deflect light. Also included are such systems as radar systems or any system wherein a radiant energy is used in scan imaging provided that the radiant energy can be redirected.

With respect to the detectors, any form of time integration detector or sensor can be used. For instance, quantum well arrays can be used, CCD arrays can be used, radar arrays and even photographic film can be used as a detector.

Figure 8:
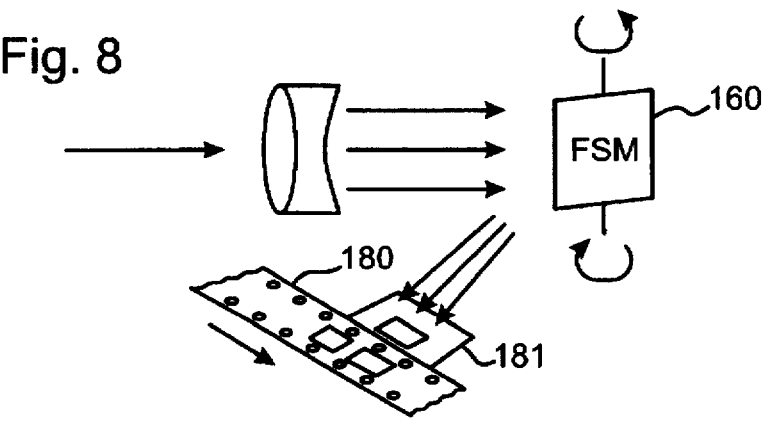

In another embodiment, the invention can be used wherein there is no relative movement of the imaging optics and object space, but rather the detector medium is moved. For instance, in motion picture film cameras, the film movement (which can be as fast as 4,000 frames per minute) traditionally involves a complicated mechanical system wherein hooks pull the film down one frame, freeze that frame, open an aperture exposing the film, close the aperture and then proceed to move to the next frame of film. By incorporating the present invention as shown in FIG. 8, the mechanisms for moving and stopping the movement of the film can be eliminated. By including a mechanism for descanning 160 the relative movement of the film 180 with reference to the object space, the film 180 can be effectively exposed a sufficient amount of time, according to the sensitivity of the film, to be imparted with an image. A shutter 181, such as an electro-optic shutter, could be used then during the snap back of the descan mechanism to its starting position. Among the advantages of this system over the prior art is the provision of greater time to set the shutter compared to the mechanical systems, which also require time for the movement of the film index hooks. This same concept can be used for imaging bar codes on packages moving along a conveyor belt, for example.

Many modifications and variations of the present invention are possible in light of the above teachings. For instance, the FSM 160 or the like is disclosed to be in collimated space, i.e., in afocal optics. Focal optics can be used if image resolution is not as critical or the optical system has a relatively large f-number. Alternatively, the FSM 160 or the like can be in front of the optical system, thus receiving collimated light directly from the FOV. It is to be understood the present invention includes all such variations within the scope of the claims appended hereto.

We claim:

1. A scanning imaging system comprising:

a scanning mechanism imparting a relative scanning movement between an imaging medium and object space;

said imaging medium receiving an image from said scanning mechanism and generating a reproducible representation of said image;

a descan mechanism for holding a line of sight in said object space for a predetermined period while said scanning mechanism continues its scanning movement: and imaging optics, wherein said imaging optics includes an afocal imaging system, said descan mechanism being in collimated light space within said afocal imaging system.

2. A scanning imaging system according to claim 1, wherein said scanning mechanism is a gimbal.

3. The scanning image system according to claim 2, wherein said afocal imaging system is mounted on said gimbal and said imaging medium is not.

4. A scanning imaging system according to claim 3, wherein said imaging optic include a derotator.

5. A scanning imaging system according to claim 4, wherein said derotator is a Pechan prism.

6. A scanning imaging system according to claim 1, wherein said imaging medium is an electronic staring focal plane array.

7. A scanning imaging system according to claim 6, wherein said staring focal plane array is a quantum well detector.

8. A scanning imaging system according to claim 6, wherein said staring focal plane array is a CCD.

9. A scanning imaging system according to claim 1, wherein said imaging medium is photographic film.

10. A scanning imaging system according to claim 1, wherein said descan mechanism is a fast steering mirror.

11. A scanning imaging system according to claim 1, wherein said descan mechanism is a pair of Risley prisms.

12. A scanning imaging system according to claim 1, wherein said descan mechanism is a polygon mirror rotating in a direction opposite to said scanning movement.

13. A scanning imaging system according to claim 1, wherein said descan mechanism is a pair of tilting plates between which is held an index matching fluid.

14. A scanning imaging system according to claim 1, wherein said scanning mechanism moves said imaging optics relative to said imaging medium.

15. A scanning imaging system according to claim 1, wherein said scanning mechanism moves said imaging medium relative to said imaging optics.

16. A scanning imaging method comprising the steps of:

imparting a continuous relative scanning movement between an imaging medium and object space;

focussing said object space onto an image plane using an afocal optical system;

imaging said object space to form a virtual image; and arresting relative movement between said virtual image and said imaging medium for an image integration period without interruption of said relative scanning movement within collimated light space within said afocal imaging system.

* * * * *